Feb. 4, 1930.   G. A. BARDET ET AL   1,745,889
KEY PLACING APPARATUS FOR TIN CANS
Filed June 13, 1928   3 Sheets-Sheet 1
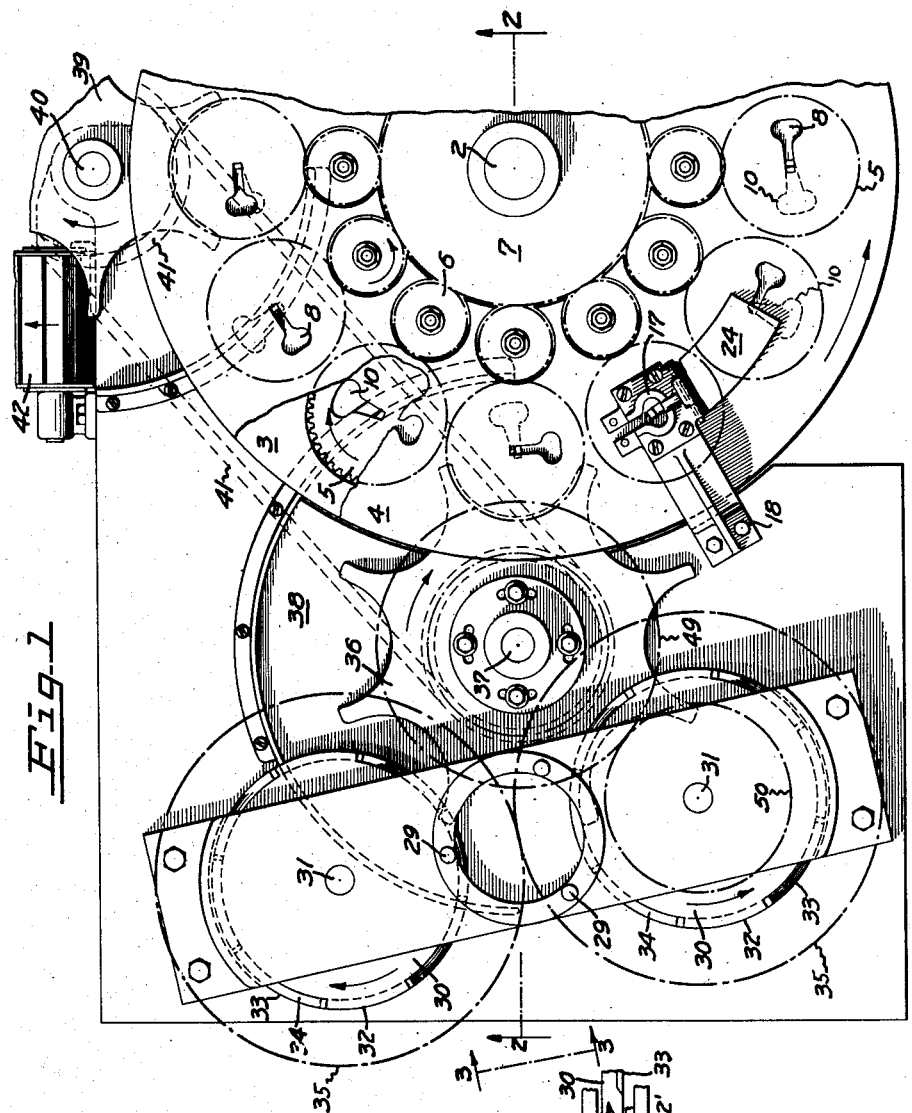
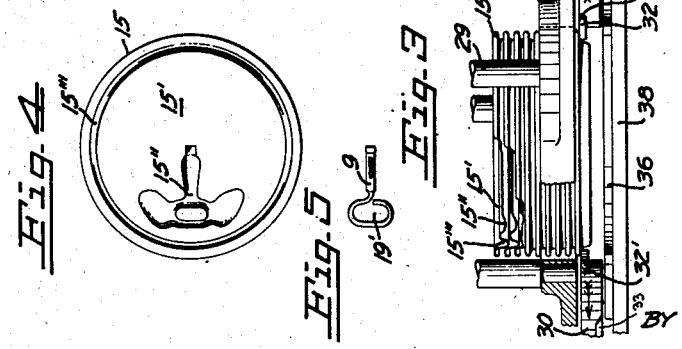
INVENTORS
GEORGE A. BARDET
GEORGE V. BARDET
BY Miller & Boykens
ATTORNEYS.

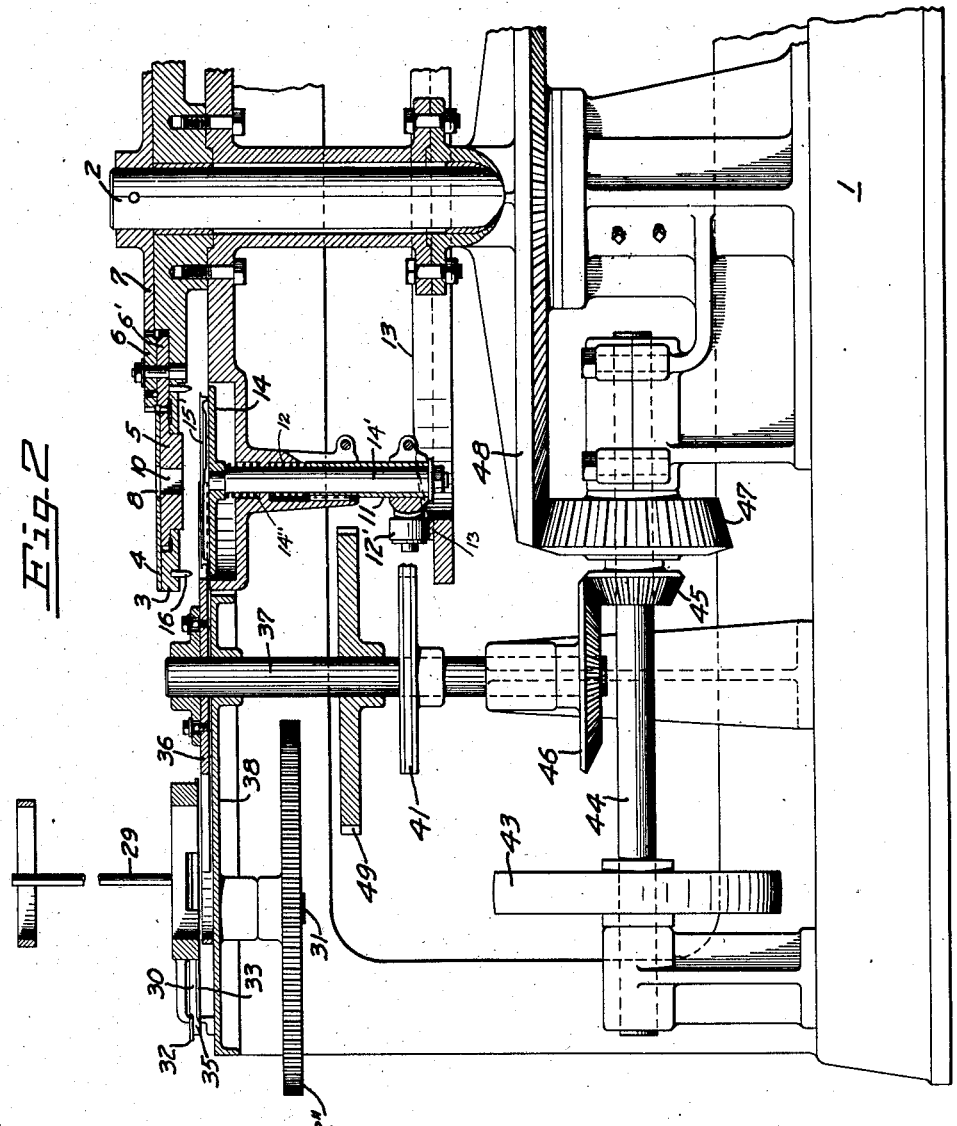

Feb. 4, 1930.   G. A. BARDET ET AL   1,745,889
KEY PLACING APPARATUS FOR TIN CANS
Filed June 13, 1928   3 Sheets-Sheet 3
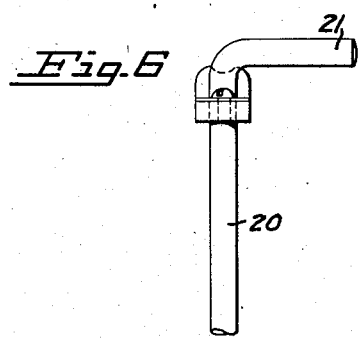
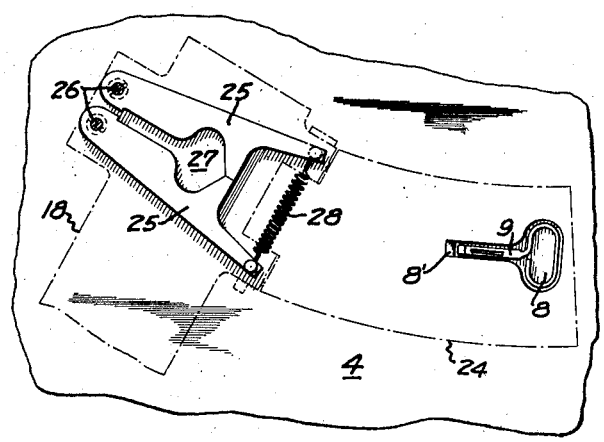
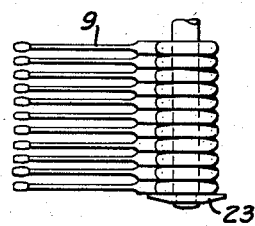
INVENTORS
GEORGE A. BARDET
GEORGE V. BARDET
BY Miller & Boyken
ATTORNEYS.

Patented Feb. 4, 1930

1,745,889

UNITED STATES PATENT OFFICE

GEORGE A. BARDET AND GEORGE V. BARDET, OF BERKELEY, CALIFORNIA, ASSIGNORS TO M. J. B. CO., OF SAN FRANCISCO, CALIFORNIA, A CORPORATION OF DELAWARE

KEY-PLACING APPARATUS FOR TIN CANS

Application filed June 13, 1928. Serial No. 284,986.

This invention relates to cans, especially tin cans provided with a tearing strip removable with a key which is furnished with the can, and the objects of the invention are to provide apparatus which will automatically separate one can lid or head at a time from a stack, separate one key at a time from a stack, deposit the key upon the lid, and place the key within a certain depression in the lid to get it in readiness for lightly soldering or otherwise securing thereto so the key will not be lost and so that the lids with keys lightly attached may each be subsequently handled as a unit in attaching the lids to the cans. Other objects are improved construction in an apparatus of this kind which will eliminate danger of breakage of the parts in case anything should go wrong with the feed, such as if two or more keys or lids be stuck together, or other exigencies arise.

Briefly described, our apparatus comprises means for picking the lids from the bottom of a stack one at a time, feeding them to a revolving turntable carrier and depositing each lid on top of a vertically movable plunger, a row of which is arranged under the table, the plungers rising thereafter to clamp the lids against the bottom of the carrier table and center each one with respect to one of a series of horizontally revolvable gears or disks carried by the table, each gear provided with a key-receiving aperture, and while the foregoing is taking place of simultaneously dropping a key from the bottom of a stack of keys through the aperture in the gear to fall upon the can lid, and of rotating the can and gear relatively whereby the key is dragged over the surface of the can lid until it falls into the key-receiving depression thereon, after which the plunger releases the lid from being clamped against the table and the lid with its key in position is passed out of the apparatus, to be received by a key-soldering machine not a part of the present invention.

In the drawings accompanying this application,

Fig. 1 is a plan view of the apparatus with portion of the carrier broken away;

Fig. 2 is a side elevation in section as seen from the line 2—2 of Fig. 1;

Fig. 3 is an enlarged side elevation of the machine as seen from the line 3—3 of Fig. 1 showing a stack of lids in the lid magazine and lid separating disks at the bottom for picking off one lid at a time;

Fig. 4 is a plan view of the upper can lid of the stack of Fig. 3 showing the key-receiving depression in the lid;

Fig. 5 is a plan view of the winding key which it is the function of the apparatus to place within the depression;

Fig. 6 is a side elevation of a stack of keys held on a special stack rod for insertion into the key stack magazine;

Fig. 7 is a plan of the lower end of the key stack rod with keys omitted;

Fig. 8 is an enlarged plan view of a portion of the turntable as seen from a plane just above the lower end of the key stack magazine to show the yieldably mounted safety jaws at the bottom of the stack for preventing jamming of the keys in case two stick together;

Fig. 9 is a side view of the intermediate gears which rotate the key aligning gears over each can, and the intermediate gears are shown in section to reveal the frictional or slip drive device positioned within to transmit power from one to the other.

In further detail the drawings show at 1 a frame supporting a stationary vertical shaft 2 around which revolves the turntable which comprises a circular rim or table 3, an overlying plate 4, a circular row of key placing disk gears 5 revolvably mounted in openings in the table and covered by the plate, intermediate friction clutch gears 6 in mesh with the disk gears and also in mesh with a large fixed central gear 7 secured to the fixed shaft 2. The arrangement being such that as the turntable is revolved the gears 6 planetate about the fixed gear and thereby rotate disk gears 5.

The cover plate 4 has a through opening 8 the shape of the key 9 (see Fig. 5) above each disk gear, and each disk gear has a similar though somewhat enlarged opening 10 extending through it so that if both openings coincide a key could be dropped straight through both members, but since in operation of the machine the disk gears 5 are always rotating the holes only coincide just after passing under the key stack magazine to be later described.

Under the table and carried on arms revolvable with it is a series of vertically movable plungers 11 each normally forced downward by a spring 12 and raised by means of a roller 12' rollable around a circular cam-ring 13 fixedly mounted on the frame 1. The upper end of each plunger is provided with a round flat head or disk 14 itself mounted for limited vertical motion with respect to the plunger by means of a stem 14' normally forced resiliently upward by a spring 14", but which spring 14" is weaker than the spring 12 which forces the plunger downward, so that the disk 14 may be depressed even when its plunger is raised by the cam.

Each disk 14 is adapted to have a can lid placed upon it for clamping against the bottom of the table 3 upon rising of the plungers. See Fig. 2 wherein the can lid is shown in section at 15', and the plunger carrying it is lowered on the cam.

Three conical pins 16 projecting from the bottom of the table insure centering of the lid under disk gear 5 and the pins projecting slightly less than the thickness of the lid act as a stop for the resiliently mounted plunger in case no lid was in place, but when a lid is in place its rim is clamped to the bottom of the table with its web 15' about a sixteenth of an inch below the bottom of the disk gear 5.

At one point above the table is a key stack magazine for dropping keys through the holes 8 in plate 4 to the disk gears. This magazine comprises a vertical guide frame 17 for the keys, carried on a bracket 18 overhanging the table. The guide frame has a vertical passage shaped for stacking the keys 19 therein, and a stack of keys is placed in the magazine by first filling a rod-like key holder. This key holder is shown in Figs. 6 and 7 and is a rod-like device or staff formed of three rods 20 each about $\frac{3}{16}$ of an inch in diameter arranged side by side so as to all pass easily through the eye or loop (19' of Fig. 5) of the keys so that a stack of keys threaded on the rods will be aligned with their shanks extending in one direction as shown at 9 in Fig. 6. In Fig. 7 showing the lower end of the key holder the three rods are designated by the circles of which one of the outer ones is numbered 20. The two outer rods are fixed, while the central rod is revolvable and provided at its upper end with a handle 21 and at its lower end a button or small plate 23 adapted to pass through the eyes of the keys when turned parallel with the three rods, and to retain the keys from falling from the device when turned in the opposite direction or across the eye of the lowermost key of the stack as shown in Figs. 6 and 7.

A large number of keys may be threaded on this holder by simply pushing it through the eyes or loops of an aligned lot of keys, and the handle 21 turned to button the keys from falling off.

To fill the magazine the holder full of keys is lowered into the magazine and the button 23 turned by means of the handle at the upper end, so as to allow the keys to fall into the magazine as the rod is withdrawn.

With the magazine filled with keys and the table revolving in direction of the arrow to bring the holes 8 of the plate successively in register with the bottom of the key stack it is manifest that the lower one would fall into the hole and the table would carry it away.

However a key might be slow in falling and the tip end of its shank might ride the rearward edge of the hole, so to obviate this we bevel the end of the hole 8 as indicated at 8' in Fig. 8 and provide a dragging plate 24 hingedly connected to the key magazine bracket so that the deposited key will pass under the plate and be forced to the bottom of the opening.

It is possible however that two keys may stick together and be carried from the magazine; as the tips of the keys are hot tinned before placing in the magazine; and to avoid injury to the machine from this cause the drag plate is formed to lift high enough to pass two or more keys, also a pair of spring actuated jaws 25 pivoted to the underside of the bracket at 26 are positioned at the bottom of the magazine just above and to clear the revolving table or plate and through an opening 27 between which jaws the keys must fall on their way to the holes 8 in the revolving plate 4. A tension spring 28 at the leaving ends of the jaws serves to resiliently pull them together, so that in case two keys which are stuck together fall into one of the holes 8 in the plate 4, one of the keys will project above it and in being passed along with the machine the key which projects above the plate 4 will press against the jaws and open them so that it can pass through, the jaws immediately closing by action of the spring.

As will be seen by reference to Figs. 3 and 4 the can lids each have a rim 15 rising slightly above the web 15', a radially arranged depression 15" adapted to receive a key with its tip lying in the center of the lid, also it should be noted that a circumferential groove 15''' in the lid forms a downwardly projecting bead extending below the key-receiving depression so that the lids when stacked are supported on these beads with rims 15 spaced one above the other.

The stack of lids is placed in a magazine comprising vertical guide bars 29 (Figs. 1 and 3) which align the lids with the rim of the lowermost lid supported on the edges of two horizontally positioned feeder disks 30.

These disks are secured to vertical shafts 31 revolved in unison by any suitable means such as spur gears 35, and the edges of the disks are peculiarly formed with a groove around the edge forming an upper 32 and a lower 33 flange and in which flanges gaps 34, are formed, the gaps being in staggered relation when viewed in plan as in Fig. 1 wherein the lower flange 33 may be seen through a gap in the upper flange 32, the arrangement being so that in revolving of the disks the stack of lids will fall through the gaps in the upper flanges to rest upon the lower flanges, and upon further revolution the advancing beveled ends 32' of the upper flanges will wedge between the rims 15 of the two lowermost lids and thus separate the lowermost lid from the stack to ride on the lower flanges to fall through its gaps to a shelf 38 and between the arms of a gap or star wheel 36 carried on a vertical shaft 37 and which wheel carries the lids along a shelf 38 and deposits each lid substantially upon the center of a plunger disk 14 as the turntable carrier is revolved.

This star wheel 36 is in gear with and timed with the other revolving elements and directly geared with a similar gap wheel 39 arranged for removing the lids from the turntable carrier after the keys have been positioned in the key-receiving depressions.

In the construction shown star or gap wheel 39 is carried on a vertical shaft 40 rotated in time with the carrier by means of chain gearing 41 from shaft 37 and the lids removed by gap wheel 39 pass directly to a conveyor chain 42 for further handling by other apparatus.

As any suitable arrangement of shafts and gearing may be employed to rotate the carrier, feeder disks and gap wheels, the transmission indicated by numerals 43 to 49 is thought sufficient for illustrative purposes.

A safety provision of the apparatus is shown in Fig. 9 wherein the intermediate planetary gears are seen to comprise an upper 6 and lower section 6' normally revolving as a unit through means of a friction button or ball 51 resiliently forced against a depression in the lower section by a spring 52 of sufficient power to develop sufficient traction between the sections, but permitting the button to rise and the sections to slip relatively to one another in case of overload such as might be caused by a misshapen key or foreign matter becoming jammed between a lid and a disk gear 5, or several lids crowded thereunder. One of the sections engages the teeth of large fixed gear 7 and the other section engages the teeth of a disk gear 5.

In operation, the apparatus being set in motion, a stack of lids and a stack of keys in position, the lids are fed one by one to the top of the plunger disks, the plungers rise; through action of the cam-ring 13; and are clamped to the bottom of the table, a key is deposited in each opening 8 of plate 4 to lie on the top surface of the rotating disk gear 5 until its hole 10 coincides with the opening 8 when the key falls to the surface of the lid and upon continuing rotation of the disk gear the key will be dragged around the lid until its key-receiving depression 15'' coincides with the hole 10 in the disk gear whereupon the key will fall into the depression and the gear will continue to rotate over it, sufficient clearance being provided for this purpose.

However, should two or more adhering keys have found their way into the relatively deep opening 10 of the disk gear no harm will result as the key-receiving depression 15'' in the lid is rounded at its bottom corners and upper edges so that the several adherent keys would simply rise again out of the depression as the disk gear rotated, and when the lid was discharged the adherent keys would drop from the disk gear and this particular lid would have no key positioned in its depression, but the apparatus would not become jammed or suffer any injury.

Just before the leaving position of the lids, the cam-ring 13 lowers the plungers to a plane just beneath the take-off gap wheels 39 and holds the plungers in this plane until the lids are deposited on them by gap wheel 36 after which the cam raises the plungers to clamp the lids against the table and center them with respect to the rotating disk gears before the keys are dropped upon the lids.

From the above description of our apparatus it will be evident that one of the principal features of the invention is the dragging of the key over the surface of the lid until it falls into the key depression, and while we show this accomplished by revolving an apertured disk above the lid, it is manifest that relative rotation of the key and lid is what is required as it makes no difference whether the key or lid is held stationary while the other is moved, or whether both are moved to accomplish the end desired.

We claim:

1. In a machine for placing a key in a depression of a can lid, means arranged and adapted for moving the key and lid relatively to one another with the key on top of the lid whereby the key will be dragged into the depression.

2. In a machine for placing a key in a depression of a can lid, means arranged and adapted for moving the key and lid relatively to one another with a circular motion with the key on top of the lid whereby the key will be dragged into the depression.

3. In a machine for placing a key in a depression of a can lid, means arranged and adapted for moving the key and lid relatively to one another with a circular motion around the center of the lid with the key on top of the lid whereby the key will be dragged into the depression.

4. In a machine of the character described, a series of key-placing devices, means for feeding can lids one at a time from a stack of lids to said key-placing devices, means for feeding keys one at a time from a stack of keys to said devices for placement thereby upon said lids.

5. In a machine of the character described, a revolvable carrier, means for revolving said carrier, means for feeding can lids one at a time to said carrier, means for feeding keys one at a time to said lids, and means for definitely positioning said keys upon said lids.

6. In a machine of the character described, a revolvable carrier, means for revolving said carrier, a series of plungers carried by said carrier, means for feeding can lids, one at a time to said plungers, means for feeding keys one at a time to said lids, and means for definitely positioning said keys upon said lids.

7. In a machine of the character described, a revolvable carrier, means for revolving said carrier, a series of plungers carried by said carrier, means for feeding can lids one at a time to said plungers, means for actuating said plungers for clamping said lids, means for feeding keys one at a time to said lids, and means for definitely positioning said keys upon said lids.

8. In a machine of the character described, means for aligning a stack of can lids, means at the bottom of the stack on which the undermost lid rests at its rim, and means for dropping said undermost lid and supporting the stack from the next lid above in the same manner as before.

9. In a machine of the character described, means for aligning a stack of can lids, spaced horizontally disposed wheels upon the edges of which the rim of the lowermost can lid rests, gaps in the edges of said wheels arranged and adapted to drop one lid at a time as the wheels are revolved, and means for revolving said wheels.

10. In a structure as specified in claim 9 said wheels provided with an upper and a lower peripheral flange in which said gaps are formed.

11. In a structure as specified in claim 9 said wheels provided with an upper and a lower peripheral flange in which said gaps are formed and said flanges and gaps staggered in a manner to drop a lid from the stack from upper to lower flanges and then from the lower flanges while retaining the stack on the upper flanges.

12. In a machine of the character described, a horizontally revolvable plate provided with an opening therethrough adapted for passing a can key, means for positioning a can lid beneath said plate, means for passing a key through said opening to said lid, and means for positioning the key upon said lid.

13. In a machine of the character described, a horizontally revolvable plate provided with an opening therethrough adapted for passing a can key, means for positioning a can lid beneath said plate, means for passing a key through said opening to said lid, means for positioning the key upon said lid comprising a horizontally rotatable gear beneath said plate provided with an opening through which said key can pass to said lid, and means for rotating said gear with respect to said lid.

14. In a machine of the character described, a horizontally revolvable carrier provided with a circular row of openings adapted to each receive a can key, means for positioning a can lid under each opening, and means for depositing a key in each opening for positioning on said lid.

15. In a machine of the character described, a horizontally revolvable carrier provided with a circular row of openings adapted to each receive a can key, a coinciding row of vertically movable plungers beneath said openings adapted each to receive a can lid, means for depositing a can lid upon each plunger, means for successively elevating the plungers to clamp the lids against the carrier, means for depositing a key in each of said openings for positioning on said lids.

16. In a machine of the character described, a horizontally revolvable carrier provided with a circular row of openings adapted to each receive a can key, a coinciding row of vertically movable plungers beneath said openings adapted each to receive a can lid, means for depositing a can lid upon each plunger, means for successively elevating the plungers to clamp the lids against the carrier, means for depositing a key in each of said openings for positioning on said lids, means for so positioning the keys, means for successively lowering the plungers to release said lids, and means for removing the lids with keys placed thereon.

17. In a machine for placing keys on can lids, means for horizontally supporting a lid, a horizontally disposed gear above and close to said lid provided with an opening for passing a key to said lid, a second gear in mesh with the first gear, a third gear concentrically arranged with the second gear, means for rotating one of the last two mentioned gears, and friction means operative between the second and third gears arranged and adapted to transmit a limited amount of power from one to the other.

18. In a machine for placing keys on can lids, a fixed horizontal gear, a turntable carrier revolvable about the fixed gear, an outer row of horizontally disposed apertured gears around the turntable, an intermediate row of gears between the outer row and the fixed gear engaging the latter arranged and adapted to rotate the outer gears upon revolving the carrier, a row of can lid supports under the outer row of gears, means for positioning a can lid on each support and means for feeding a key through the aperture of each of the outer row of gears to the lid beneath the same.

19. In a stucture as specified in claim 18, a plate above the outer gears apertured to receive the keys, and a dragging plate arranged and adapted to force the keys into the openings in said plate.

20. In a structure of the character described, means for feeding keys one at a time from the bottom of a stack of keys, an apertured carrier in the apertures of which said keys are received, and a resiliently mounted member at the bottom of the stack adapted to pass more than one key if several are stuck together.

21. In a machine of the character described, a movable carrier, a plate beneath the carrier, means for placing a can lid upon said plate, means by which said plate is vertically movable to clamp said lid against the carrier, and devices projecting downward from the carrier adapted to engage the edge of said lid and center same as the plate is raised.

GEORGE A. BARDET.
GEORGE V. BARDET.